E. P. CAMPBELL.
OUTER BALL RACE EXTRACTOR.
APPLICATION FILED APR. 5, 1920.

1,367,016. Patented Feb. 1, 1921.

INVENTOR.
Ernest P. Campbell
BY
ATTORNEY

UNITED STATES PATENT OFFICE.

ERNEST P. CAMPBELL, OF STOCKTON, CALIFORNIA, ASSIGNOR OF ONE-HALF TO JOSEPH E. GOODMAN, OF STOCKTON, CALIFORNIA.

OUTER-BALL-RACE EXTRACTOR.

1,367,016.  Specification of Letters Patent.  Patented Feb. 1, 1921.

Application filed April 5, 1920. Serial No. 371,554.

*To all whom it may concern:*

Be it known that I, ERNEST P. CAMPBELL, a citizen of the United States, residing at Stockton, in the county of San Joaquin, State of California, have invented certain new and useful Improvements in Outer-Ball-Race Extractors; and I do declare the following to be a full, clear, and exact description of the same, reference being had to the accompanying drawings, and to the characters of reference marked thereon, which form a part of this application.

This invention relates to improvements in devices for extracting the outer races of ball bearings from their shells.

It is designed as a unit tool for the purpose, taking the place of and being an improvement over the devices shown in my Patents No. 1,171,590 dated February 15th, 1916, and No. 1,241,819 dated October 2nd, 1917.

The principal object of the invention is to provide a device for readily loosening outer ball races in their holding member, it being well known that such races are firmly driven or pressed into the shell, and it is hard to remove them without the use of my device except by drilling into or otherwise mutilating the shell.

I have also provided an attachment to be used in connection with my extractor when the latter is used for extracting the ball races in magneto shaft caps, whereby the race, having been started or loosened by the extractor, may then be easily and gradually forced out of the shell.

Another object of my invention is to so construct the gripping members of the extractor that there will be no tendency for the ball race to be sprung or warped out of shape by the action of the extractor thereon.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
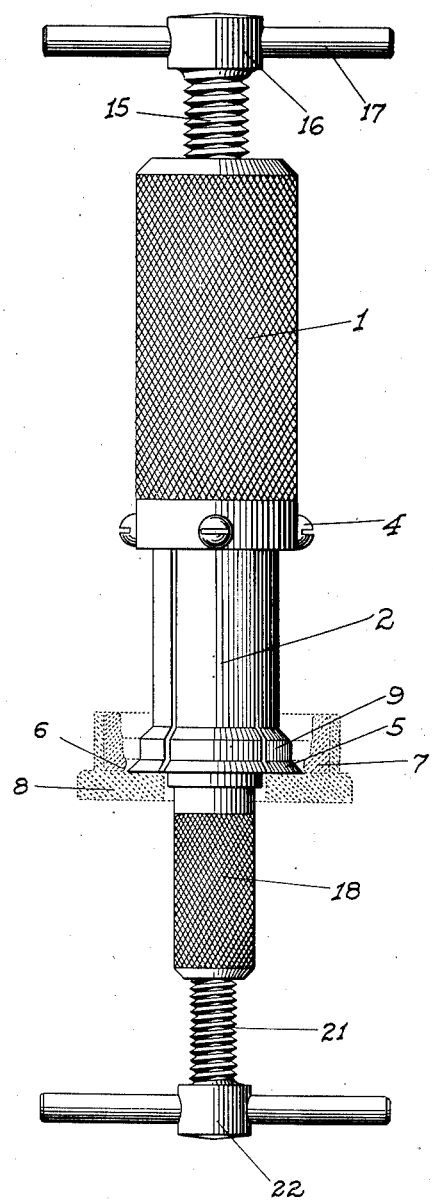
Figure 1 is a side elevation of the complete device in conjunction with the magneto cap attachment.
Figure 2:
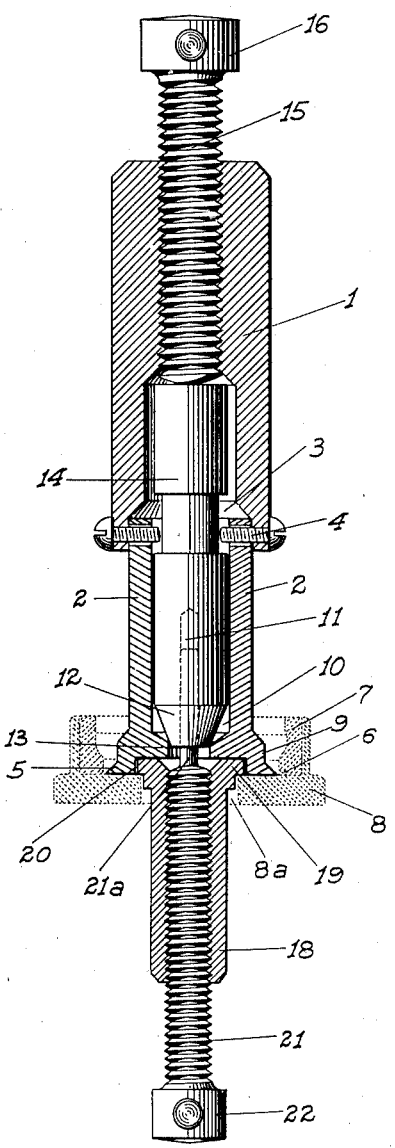
Fig. 2 is a longitudinal section of the same.

Referring now more particularly to the characters of reference on the drawings, the numeral 1 denotes a shell or casing having a plurality of expandible jaws 2 projecting into a socket 3 in the casing and being flexibly connected thereto adjacent their ends as at 4.

The outer ends of the jaws flare outwardly to form wedge shaped portions 5 adapted to wedge under the inner curved edge 6 of an outer ball race 7 mounted in a shell 8.

Adjacent the wedge portions 4 of the jaws and inwardly of the same the jaws are provided with shoulders 9 adapted to bear against the inner periphery of the race 7 after the jaws have expanded a certain distance.

The jaws are segments of a ring in cross section, and when assembled form a hollow shell, leaving a substantially circular orifice 10 extending lengthwise thereof. Positioned in this orifice is a pin 11, having its outer end tapered as at 12 to engage shoulders 13 projecting inwardly from the orifice 10 at its outer end.

The inner ends of the pin 11 are provided with an enlarged or shouldered portion 14 adapted to abut against the inner ends of the jaws, after the pin has moved a predetermined distance outwardly.

Against this end of the pin bears a screw 15 threaded into the casing and having a head 16 on its outer end adapted to receive a pin 17, wrench or other turning device.

It will therefore be evident that by inserting the jaws into the ball race so that the wedge portions thereof engage the inner edges of the race, and then turning the screw 15, the jaws will be expanded and the race forced part way out by the wedging action of said jaws, or until the shoulders thereon engage the sides of the race.

To complete this forcing out of the race, without pulling the same directly by main strength, I provide, when conditions permit, an attachment adapted to be positioned in and held by the shell from which the ball race is to be extracted.

The necessary conditions are obtained when the race is in a magneto-shaft end plate or cap, such as outlined on the drawing at 8, in which the shaft-bore 8ª is considerably smaller than the bore of the ball race.

This attachment consists of a cylindrical member 18 adapted to pass through the bore 8ª, and having a shoulder 19 adapted to rest on the inner face of the shell 8. This shouldered portion also projects into a recess 20 provided in the outer ends of the jaws. The member 18 has a longitudinal screw 21 threaded therein and extending therethrough, and having a head 22 to allow the screw to be readily turned, and an extension 21ª on its inner end slidable in the pin 11, to act as a guide.

In operation, the member 8 is of course first removed from the magneto or other device, and the member 18 slipped in place, the screw 21 being retracted so that it is somewhat below the end of said member.

The main jaw appliance is then inserted, and the screw 15 actuated. The jaws are thus forced into engagement with the ball race 7, forcing the same outwardly, until the shoulders 9 on the jaws engage the sides of the race, which of course limits the movement of the jaws.

At the same time, the pin 11 is moving in the opposite direction toward the screw 21, and on the jaws arriving at their limit of movement, the screw 21 is turned, engaging the pin 11 and thus forcing the entire appliance away carrying the ball race with it, with a minimum of effort on the part of the operator.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:—

1. An outer ball-race extractor comprising a casing, a plurality of jaws flexibly mounted therein at one end, said jaws when closed forming substantially a cylindrical tube, and the outer ends thereof being wedge shaped and adapted to be forced under the inner edge of a ball race, a pin in the tube formed by the jaws, the outer end being tapered, tapered shoulders on the jaws projecting inwardly and against which the tapered end of the pin bears, and a screw threaded into the casing and engaging the inner end of the pin.

2. An outer ball-race extractor comprising a casing, a plurality of jaws flexibly mounted therein at one end, said jaws when closed forming substantially a cylindrical tube, and the outer ends thereof being wedge shaped and adapted to be forced under the inner edge of a ball race, a pin in the tube formed by the jaws, adapted to force the jaws apart when moved outwardly, and means in the casing for so moving the pin.

3. An outer ball-race extractor including a casing, a plurality of jaws flexibly mounted therein at one end and adapted to be forced apart, said jaws having outwardly projecting wedge shaped portions on their outer ends adapted to be forced between the inner edge of the ball race and the member in which it is mounted, and shoulders on the jaws adjacent the wedge portions adapted to bear against the inner periphery of the race after the jaws are spaced.

4. An outer ball-race extractor including a casing, a plurality of jaws flexibly mounted therein at one end and adapted to be forced apart, said jaws having outwardly projecting wedge shaped portions on their outer ends adapted to be forced between the inner edge of the ball race and the member in which it is mounted, and means removably mounted in said member for forcing the jaw members and the race engaged thereby out of the member after the jaws have been spread to their limit of movement in the race.

5. An outer ball-race extractor comprising a casing, a plurality of jaws flexibly mounted therein at one end, said jaws when closed forming substantially a cylindrical tube, and the outer ends thereof being wedge shaped and adapted to be forced under the inner edge of a ball race, a pin in the tube formed by the jaws, and adapted to force the jaws apart when moved outwardly and projecting then beyond the jaws, and means removably mounted in the ball-race retaining member for then engaging the pin and forcing the casing and parts component therewith away from said retaining member.

6. An outer ball-race extractor comprising a casing, a plurality of jaws flexibly mounted therein at one end, said jaws when closed forming substantially a cylindrical tube, and the outer ends thereof being wedge shaped and adapted to be forced under the inner edge of a ball race, a pin in the tube formed by the jaws, and adapted to force the jaws apart when moved outwardly, and projecting then beyond the jaws, a removable member adapted to be held by the ball-race retainer and positioned opposite to the pin and jaws, and a screw in said member adapted to be turned to bear against the pin and force the latter and the parts component therewith away from the retainer.

In testimony whereof I affix my signature.

ERNEST P. CAMPBELL.